March 26, 1929.   S. T. LEWIS   1,707,061
RECORDING DEVICE FOR METERS
Original Filed April 23, 1926   2 Sheets-Sheet 1

Stanley Thomas Lewis
INVENTOR

BY Victor J. Evans
ATTORNEY

WITNESS.

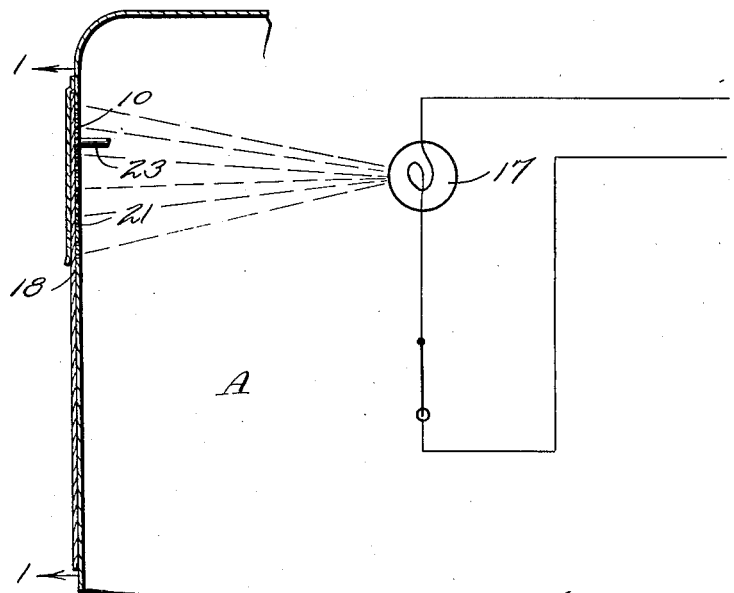

Patented Mar. 26, 1929.

1,707,061

UNITED STATES PATENT OFFICE.

STANLEY THOMAS LEWIS, OF REGINA, SASKATCHEWAN, CANADA.

RECORDING DEVICE FOR METERS.

Application filed April 23, 1926, Serial No. 104,206. Renewed August 20, 1928.

This invention relates to recording devices, particularly those of a type designed for use in connection with meters of all kinds, and has for its object the provision of a novel photographic means of recording, permanently, the readings of a meter of any kind, such for instance as those used in connection with electric light lines, gas lines, or the like, the advantage being that a permanent record may be made of the meter reading at any predetermined time without it being necessary for the reader to actually inspect and make notations as to whatever indications may be given.

It is well known that in the case of electric lights, gas and other meters, it is customary for the public utility company to send a reader to inspect the meter and make notations as to the indications thereon of the consumption of electricity, gas, or whatever else passes through the meter. Such readings are not always accurate and there is not necessarily a permanent record thereof and it frequently occurs that the consumers are dissatisfied with the amounts of the bills rendered. It is also possible that the public utility company, or other person in charge of the meters, may lose owing to inaccuracies in the work of the meter readers.

It is with the above facts in view that I have designed the present invention which has for a more specific object the provision of indicator dials or disks of such formation that portions thereof will be transparent so that when a sensitized card or sheet is disposed thereagainst and a light displayed within the meter a photographic record of the reading will be obtained almost instantaneously, there being obviously no possibility of error in so far as reading of the meter is concerned.

Another object of the invention is to provide the combination of illuminating means within a meter, transparent portions in the indicating dials or disks to permit passage of light therethrough, and a light-sensitive card or sheet disposable against the dials or disks so as to receive a photographic impression.

An additional object of the invention is to provide an apparatus or device of this character which will be simple and inexpensive in manufacture, easy to install, quick and easy to operate, positive in action, efficient and durable in service, and a general improvement in the art.

With the above and other objects in view, the invention further includes the following novel features and details of construction, to be hereinafter more fully described, illustrated in the accompanying drawing and pointed out in the appended claims.

In the drawings:—

Figure 3 is a vertical section showing the application of the invention and;

Figure 4 is an elevation of one of the cards representing the photographic impression thereon.

Figure 1:
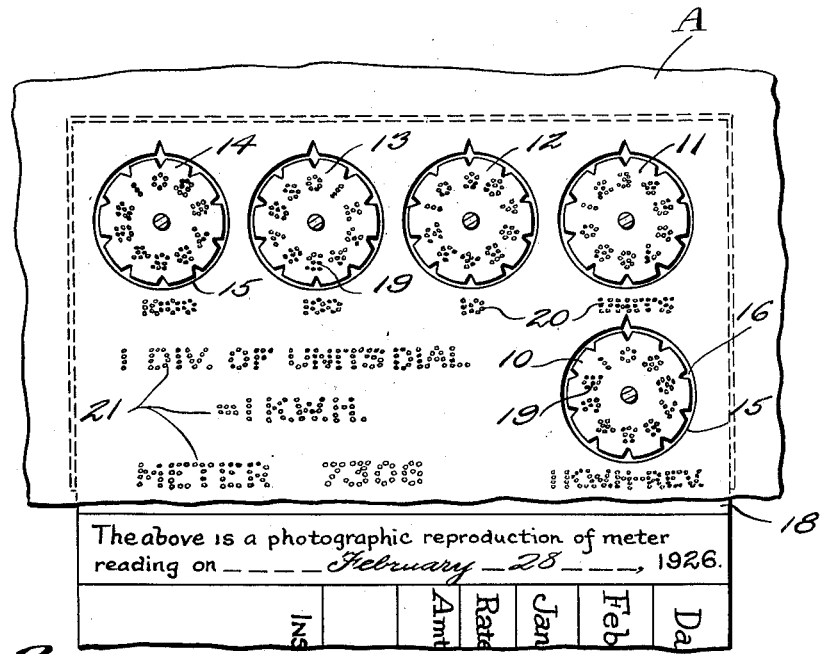
Figure 1 is a vertical section taken on the line 1—1 of Figure 3.

Referring more particularly to the drawings, Figure 1 discloses one form of the invention in which the meter A embodies a plurality of disks 10, 11, 12, 13, and 14 operating within openings 15 of slightly larger diameter to leave a circular space 16 between the periphery of the disk and the periphery of the opening, through which space light may shine from an incandescent bulb 17 or the like, located within the meter onto or through the sensitized card or paper 18 upon which the record is to be formed. These disks are, in Figure 1, represented as provided with numerals 19 formed by perforating the disk, or each disk. Furthermore, the shell of the meter is provided beneath, or at some other convenient place adjacent the respective disks or dials, with legends 20 indicating units, tens, hundreds, thousands, and kilowatt hours. Furthermore, the front of the casing of the meter may be provided with other legends 21 giving the units, the meter number and the like, these legends being formed by a series of perforations, slits, or openings, as may be preferred.

Figure 2:
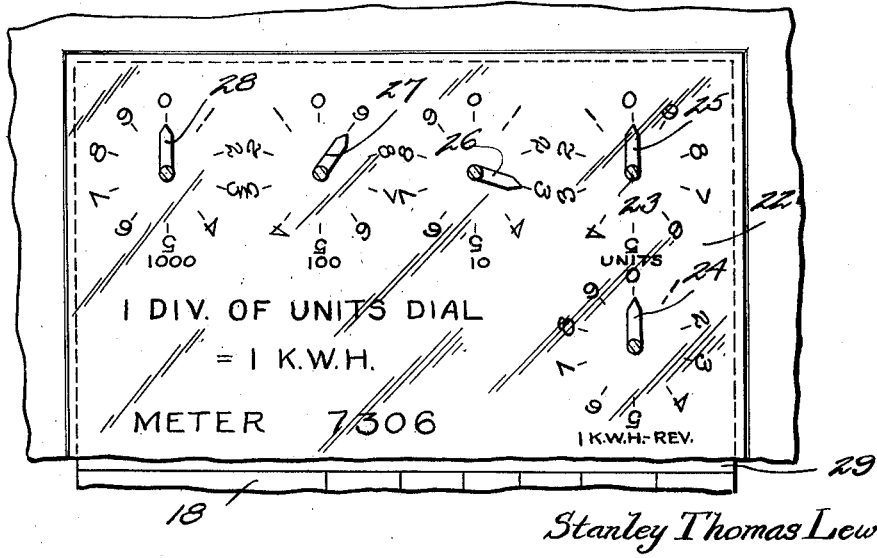
Figure 2 is an elevation of the meter showing the construction thereof in accordance with the invention.

In Figure 2, I have illustrated a modification in which the meter is provided with a transparent panel 22 through which or adjacent which extend the arbors or spindles 23 of a plurality of indicating hands 24, 25, 26, 27 and 28 movable over series of numerals, ranging, customarily, from naught to nine, as clearly indicated. In this form of the invention the various legends as to the number of the meter, the units and other data would be formed of opaque material upon the glass panel, though, it should be understood, that if desired, the panel itself might be opaque with the numerals and legends transparent, so that light might pass through.

In carrying out either form of the invention, use is made of the sensitized sheet or card above referred to by the numeral 18, which card may bear any desired indicia or legends as to the schedule of rates, the date, meter readings, rate of consumptions, amount due on the bill, instructions or the like, at least one end of the card being provided with a sensitized area 29 capable of receiving a photographic impression.

In the operation of the invention, it will be seen that the meter reader is supplied with a number of such sensitized cards which, necessarily, must be protected against the influence of light when not in use. When the meter reader intends to make an inspection and a reading of a meter, he removes one of the cards from whatever device they are carried in and places the card against the dial portion of the meter. Subsequently, a push button switch or any other switch device is operated to close the circuit through the illuminating means 17 so that light will pass through the dials, in case they are transparent, or through the perforations in the dials in case they are opaque, the light acting upon the sensitized surface or area 29 of the card 18 and making a photographic impression which may later be developed in any of the well known methods or manners. Obviously, a permanent record will be made which is bound to be accurate inasmuch as there is no possibility of error unless the meter itself is out of order and it is quite clear that this will be a great benefit, not only to the consumer, but also to the public utility company operating the meters.

A very important feature of advantage in this invention is that the consumers may be provided with sensitized cards so that they may themselves make the readings of the meter and send them in to the public utility company operating the electric light service or else that such cards may be collected by some authorized person. Obviously, this will save the electric light company the great expense of employing a large number of meter readers for the purpose of going around from place to place and house to house and making actual readings of the meters. This will be a great saving in the cost of labor and will possess the advantages above enumerated in regard to accuracy of the readings.

While I have shown and described the preferred embodiment of the invention, it should be understood that I reserve the right to make such changes in the form, construction and arrangement of parts as will not depart from the spirit of the invention or the scope of the subjoined claim.

Having thus described my invention, what I desire to claim as new is:—

In a meter, a meter shell having openings therein, indicator dials mounted within and spaced from the openings to provide light passages around said dials, said dials having perforations therein also providing light passages, and said shell also having openings providing light passages, said dial and shell openings being arranged to define indicia relative to the meter, illuminating means upon one side of the light passages and a light sensitive record sheet disposable against the meter upon the opposite side of the light passages to receive a photographic impression.

In testimony whereof I affix my signature.

STANLEY THOMAS LEWIS.